(12) United States Patent
Cook

(10) Patent No.: US 7,173,949 B2
(45) Date of Patent: Feb. 6, 2007

(54) LASER EFFECTS AND LASER DEVICES

(75) Inventor: Gary Cook, Worcs (GB)

(73) Assignee: Qinetiq Limited, Farnborough (GB)

( * ) Notice: Subject to any disclaimer, the term of this patent is extended or adjusted under 35 U.S.C. 154(b) by 500 days.

(21) Appl. No.: 10/148,681

(22) PCT Filed: Dec. 1, 2000

(86) PCT No.: PCT/GB00/04574

§ 371 (c)(1),
(2), (4) Date: Jun. 26, 2002

(87) PCT Pub. No.: WO01/41264

PCT Pub. Date: Jun. 7, 2001

(65) Prior Publication Data

US 2004/0213300 A1    Oct. 28, 2004

(30) Foreign Application Priority Data

Dec. 3, 1999  (GB)  .................. 9928474.7

(51) Int. Cl.
*H01S 3/30* (2006.01)
(52) U.S. Cl. ............................. 372/3; 372/6
(58) Field of Classification Search ............ 372/3, 372/92, 6
See application file for complete search history.

(56) References Cited

U.S. PATENT DOCUMENTS

| | | | |
|---|---|---|---|
| 4,136,316 A | | 1/1979 | Chicklis et al. |
| 4,173,738 A | | 11/1979 | Boling et al. |
| 4,803,439 A | | 2/1989 | Ryan |
| 5,096,277 A | * | 3/1992 | Kleinerman .............. 385/12 |
| 5,122,178 A | | 6/1992 | Omi et al. |
| 5,222,810 A | * | 6/1993 | Kleinerman .............. 374/161 |
| 5,418,182 A | | 5/1995 | Ford |
| 5,434,878 A | | 7/1995 | Lawandy |
| 5,485,480 A | * | 1/1996 | Kleinerman .............. 372/6 |
| 5,592,282 A | * | 1/1997 | Hartog .............. 356/44 |

(Continued)

FOREIGN PATENT DOCUMENTS

EP    0 784 217    7/1997

(Continued)

OTHER PUBLICATIONS

P.W. France, "Optical Fibre Lasers and Amplifiers" 1991, pp. 144-150.

(Continued)

*Primary Examiner*—Minsun Oh Harvey
*Assistant Examiner*—Delma R. Flores-Ruiz
(74) *Attorney, Agent, or Firm*—Nixon & Vanderhye P.C.

(57) ABSTRACT

A glass fiber (22) has a core (24) provided with Raman laser effect particles (28) embedded in a glass matrix (30), with glass cladding (26) around the core. The refractive index of the glass matrix (30) is matched to that of the Raman laser effect particles (28) so as to avoid scattering. It is not necessary to have a single crystal of Raman laser material to create a laser effect in the glass fiber. A length of fiber in the order of meters or tens of meters can produce optical laser light. It is possible to have a single fiber (22) emit laser light at different frequencies due to Stokes and Anti-Stokes emissions. A simple laser device can therefore produce several colors of laser beams.

33 Claims, 10 Drawing Sheets

U.S. PATENT DOCUMENTS

| | | | |
|---|---|---|---|
| 5,696,863 A * | 12/1997 | Kleinerman | 385/123 |
| 5,717,517 A | 2/1998 | Alfano et al. | |
| 5,778,014 A * | 7/1998 | Islam | 372/6 |
| 5,796,761 A * | 8/1998 | Injeyan et al. | 372/3 |
| 5,858,891 A | 1/1999 | Auzel et al. | |
| 5,991,479 A * | 11/1999 | Kleinerman | 385/31 |
| 5,991,653 A * | 11/1999 | Richards-Kortum et al. | 600/475 |
| 6,028,666 A * | 2/2000 | Boss et al. | 356/301 |
| 6,304,369 B1 * | 10/2001 | Piehler | 359/337.4 |
| 6,373,869 B1 * | 4/2002 | Jacob | 372/22 |
| 6,434,172 B1 * | 8/2002 | DiGiovanni et al. | 372/6 |
| 6,610,351 B2 * | 8/2003 | Shchegolikhin et al. | 427/7 |
| 6,879,604 B2 * | 4/2005 | Cook | 372/3 |
| 6,885,683 B1 * | 4/2005 | Fermann et al. | 372/25 |

OTHER PUBLICATIONS

M. Oguma et al. "Tunable Er-Doped Y-Branced Waveguide Laser" *IEEE Photonocs Technology Letters*, vol. 6, No. 5, May 1994, pp. 586-587.

G. N. van den Hoven et al, "Net Optical Gain at 1.53 um in Er-doped $Al_2 O_3$ Waveguides on Silicon" *Appl. Phys. Lett.* vol. 63 (14), Apr. 1996, pp. 1886-1888.

C.T.A. Brown et al, "900-nm $Nd:Ti:LiNbO_3$ Waveguide Laser" *Optics Letters* vol. 22, No. 23, Dec. 1997, pp. 1778-1780.

\* cited by examiner

Spontaneous Raman scattering parameters of crystals

| Material | Lattice space group | Molecular group | Raman freq. $\Omega_R$ (cm$^{-1}$) | Raman line width $\Delta\Omega_R$ (cm$^{-1}$) | Integral cross section $\Sigma_{int}$ (a.u.) | Peak intensity $\Sigma_{peak}$ (a.u.) | Scattering geometry of excitation | |
|---|---|---|---|---|---|---|---|---|
| | | | | | | | K | E |
| Diamond | $O_h^7$ | | 1332.9 | 2.7 | 100 | 100 | $\|C_3$ | $\perp C_3$ |
| SiO$_2$ | $D_3^6$ | [SiO$_4$] | 464.5 | 7.0 | 2.2 | 1.2 | $\perp C_3$ | $\|C_3$ |
| Nitrates and calcite | | | | | | | | |
| Ba(NO$_3$)$_2$ | $T_h^6$ | [NO$_3$] | 1048.6 | 0.4 | 21 | 63 | $\|C_4$ | $\|C_4$ |
| NaNO$_3$ | $D_{3d}^6$ | [NO$_3$] | 1069.2 | 1.0 | 23 | 44 | $\|C_3$ | $\perp C_3$ |
| CaCO$_3$ | $D_{3d}^6$ | [CO$_3$] | 1086.4 | 1.2 | 6.0 | 10.6 | $\|C_3$ | $\perp C_3$ |
| Tungstates | | | | | | | | |
| CaWO$_4$ | $C_{4h}^6$ | [WO$_4$] | 910.7 | 4.8 | 47 | 18.6 | $\perp C_4$ | $\|C_4$ |
| SrWO$_4$ [a] | $C_{4h}^6$ | [WO$_4$] | 921.5 | 3 | – | – | | |
| BaWO$_4$ [a] | $C_{4h}^6$ | [WO$_4$] | 926.5 | 2.2 | – | – | | |
| NaY(WO$_4$)$_2$ [a] | $C_{4h}^6$ | [WO$_4$] | 918 | 15[b] | – | – | | |
| KGd(WO$_4$)$_2$ | $C_{2h}^6$ | [WO$_6$] | 901 | 5.4 | 54 | 25 | $\perp C_2$ | $\perp C_2$ |
| KGd(WO$_4$)$_2$ | $C_{2h}^6$ | [WO$_6$] | 901 | 5.4 | 43 | 22 | $\perp C_2$ | $\|C_2$ |
| KGd(WO$_4$)$_2$ | $C_{2h}^6$ | [WO$_6$] | 768 | 6.4 | 19 | 8.2 | $\perp C_2$ | $\perp C_2$ |
| KGd(WO$_4$)$_2$ | $C_{2h}^6$ | [WO$_6$] | 768 | 6.4 | 65 | 29 | $\perp C_2$ | $\|C_2$ |
| KY(WO$_4$)$_2$ | $C_{2h}^6$ | [WO$_6$] | 905.6 | 7 | 50 | 24 | $\perp C_2$ | $\perp C_2$ |
| KY(WO$_4$)$_2$ | $C_{2h}^6$ | [WO$_6$] | 905.6 | 7 | 45 | 22 | $\perp C_2$ | $\|C_2$ |
| KY(WO$_4$)$_2$ | $C_{2h}^6$ | [WO$_6$] | 767.4 | 8.4 | 20 | 9 | $\perp C_2$ | $\perp C_2$ |
| KY(WO$_4$)$_2$ | $C_{2h}^6$ | [WO$_6$] | 767.4 | 8.4 | 64 | 24 | $\perp C_2$ | $\|C_2$ |
| KYb(WO$_4$)$_2$ | $C_{2h}^6$ | [WO$_6$] | 908 | 7.4 | 48 | 24 | $\perp C_2$ | $\perp C_2$ |
| KYb(WO$_4$)$_2$ | $C_{2h}^6$ | [WO$_6$] | 908 | 7.4 | 48 | 24 | $\perp C_2$ | $\|C_2$ |
| KYb(WO$_4$)$_2$ | $C_{2h}^6$ | [WO$_6$] | 757 | 15[b] | 25[b] | 13.8[b] | $\perp C_2$ | $\perp C_2$ |
| KYb(WO$_4$)$_2$ | $C_{2h}^6$ | [WO$_6$] | 757 | 15[b] | 70[b] | 25[b] | $\perp C_2$ | $\|C_2$ |
| Molybdates | | | | | | | | |
| CaMoO$_4$ | $C_{4h}^6$ | [MoO$_4$] | 879.3 | 5.0 | 64 | 34 | $\perp C_4$ | $\|C_4$ |
| SrMoO$_4$ | $C_{4h}^6$ | [MoO$_4$] | 887.7 | 2.8 | 55 | 51 | $\perp C_4$ | $\|C_4$ |
| BaMoO$_4$ | $C_{4h}^6$ | [MoO$_4$] | 892.4 | 2.1 | 52 | 64 | $\perp C_4$ | $\|C_4$ |
| Iodate and niobates | | | | | | | | |
| LiIO$_3$ | $C_6^6$ | [IO$_3$] | 821.6 | 5.0 | 54 | 25 | $\|C_3$ | $\perp C_3$ |
| LiNbO$_3$ | $C_{3v}^6$ | [NbO$_6$] | 872 | 21.4 | 44 | 5 | $\|C_3$ | $\|C_3$ |
| LiNbO$_3$ | $C_{3v}^6$ | [NbO$_6$] | 632 | 27 | 166 | 18 | $\perp C_3$ | $\perp C_3$ |
| LiNbO$_3$ | $C_{3v}^6$ | [NbO$_6$] | 250 | 28 | – | 22 | $\perp C_3$ | $\perp C_3$ |
| LaNbO$_3$ | $C_{2h}^3$ | [NbO$_4$] | 805 | 9 | 22 | 7.1 | $\perp C_3$ | $\perp C_3$ |
| Phosphates | | | | | | | | |
| Ca$_5$(PO$_4$)$_3$F | $C_{6h}^2$ | [PO$_4$] | 964.7 | 2.8 | 3.4 | 3.8 | $\perp C_6$ | $\|C_6$ |
| Sr$_5$(PO$_4$)$_3$F | $C_{6h}^2$ | [PO$_4$] | 950.3 | 2.8 | 3.4 | 3.8 | $\perp C_6$ | $\|C_6$ |

[a] Polycrystal sample
[b] Line with inhomogeneous splitting

*Fig. 5*

Estimated Raman gain coefficients for excitation at 1064 nm

| Substance | Raman shift / cm⁻¹ | Gain coeff. for 1st Raman line (cm.GW⁻¹) | 1st Raman wavelength / nm | 2nd Raman wavelength / nm | Trans-Mission |
|---|---|---|---|---|---|
| LiNbO$_3$ | 253/274 | | | | |
| | 631 | 11.5 | 1141 | 1229 | Y |
| KTP | 268 | 23.1 | 1095 | 1128 | Y |
| | 694 | 15.7 | 1149 | 1248 | Y |
| Ba(NO$_3$)$_2$ | 1047 | 13.2 | 1197 | 1369 | Y |
| LiIO$_3$ | 782 | 11.6 | 1161 | 1276 | Y |
| ZGP | 330 | 52.2 | 1103 | 1144 | N |
| | 396 | 32.9 | 1111 | 1162 | N |
| SrMoO$_4$ | 326 | 6.8 | 1102 | 1143 | Y |
| | 795 | 5.0 | 1162 | 1281 | Y |
| | 886 | 19.8 | 1175 | 1311 | Y |
| CaMoO$_4$ | 322 | | 1102 | 1142 | Y |
| | 793 | | 1162 | 1280 | Y |
| | 878 | 14.2 | 1174 | 1308 | Y |
| Nd:GdVO$_4$ | 808 | | 1164 | 1285 | Y |
| | 823 | 7.1 | 1166 | 1290 | Y |
| | 883 | 20.8 | 1174 | 1310 | Y |
| Ho:YAP | 495 | 28.9 | 1123 | 1189 | Y |
| Ho:YAG | 833 | | 1167 | 1293 | Y |
| CaCO$_3$ | 1088 | 4.1 | 1203 | 1385 | Y |
| PbCl$_2$ | 180 | | 1085 | 1106 | |
| KTA | 700 | 7.2 | 1150 | 1250 | Y |
| | 340 | | 1104 | 1147 | Y |
| | 267 | | 1095 | 1128 | Y |
| RTA | 665 | 37.8 | 1145 | 1239 | |
| | 333 | 14.4 | 1103 | 1145 | |
| YLF | 606 | 152.8 | 1137 | 1222 | Y |
| | 606 | 205.7 | 1137 | 1222 | Y |

*Fig. 6*

LASER EFFECTS AND LASER DEVICES

This application is the U.S. national phase of international application PCT/GB00/04574, filed in English on 1 Dec. 2000 which designated the U.S. PCT/GB00/04574 claims priority to GB Application No. 9928474.7 filed 3 Dec. 1999. The entire contents of these applications are incorporated herein by reference.

This invention relates to laser effects and devices, especially but not exclusively Raman effect systems. It also relates to optical parametric oscillators and light frequency changing devices which use a laser or other photon-emitting effect.

By "light" is meant electromagnetic radiation, not necessarily visible light, but the invention has considerable applications in the visible spectrum, and the visible spectrum is an important area.

The invention is especially applicable to continuous wave lasers, but also may have uses in pulsed laser systems.

Although the man skilled in the art will already know it, the reader is directed to read volume 11, No. 4, March 1999 of Optical Materials, published by Elsevier Science which contains seven articles relating to solid state Raman lasers and their history. The contents of that Journal are hereby incorporated by reference into the contents of this patent application.

As will be appreciated by the skilled man, diode solid state lasers are known, and are typically red. There are also green solid state diode-pumped lasers for example frequency doubled Nd:YAG lasers (they have a resonant amplification cavity which frequency doubles to produce green light). These are continuous wave lasers of about 10W power. Blue solid state lasers have recently become available. Solid state lasers are typically low power, and a problem is that the laser usually produces light at only a signal wavelength.

Another sort of laser is the argon ion laser, and the krypton ion laser. These are gas lasers which often require a three phase electricity supply, and water cooling. They are typically used in the entertainment industry. There is currently a market of hundreds of millions of dollars world-wide for these. They are also used for photodynamic therapy—medical uses Again there is a very large market for lasers for medical use.

It is possible to frequency double or triple using crystals. The same energy that goes into a crystal must come out (ignoring heating). In frequency doubling, two photons enter the crystal (e.g. 1.064 µm) and one photon emerges, equal in energy to the sum of the two entering photons (e.g. 532 nm).

There are also optical parametric oscillators (OPOs) which use the same kinds of crystals as frequency doubling equipment. In OPOs, one photon of one wavelength goes in and two photons of a different wavelength, but same overall energy, come out. The two emitted photons need not have the same wavelength.

By tuning the crystals so that a different lattice plane faces the incident direction of radiation it is possible to tune it to get two photons out, each with a different frequency, but again with the sum of the output energies the same as the original energy. The gain is quite low on these systems. It is conventionally necessary to work with pulsed lasers with high intensity beams.

The OPO crystal must be carefully adjusted to ensure the refractive index is the same for all three wavelengths (i.e. the pump, signal and idler beams must be phase-matched). OPOs are very expensive since they are designed for one laser, typically. There are no commercially available continuous wave OPO lasers—only pulsed lasers. Commercial continuous wave lasers cannot get the intensity required to operate an OPO efficiently.

In the absence of pump depletion, the intensity of output light from an OPO is related to the crystal gain coefficient, times the intensity of pumping radiation times the interaction length that the radiation has within the crystal (e.g. real length times the number of passes through the crystal). It is an exponential relationship of the kind:

$$I_{output} = I_{input} \times e^{Ipump \times gain\ coefficient \times Interaction\ length}$$

For a continuous wave laser, in which the gain is usually very low, the first mirror needs to be 100% reflective, and the second mirror needs to be less than 100% reflective, but must still have a high reflectivity, owing to the low gain in continuous wave lasers. Continuous wave lasers require very precisely engineered high quality mirrors. Diffraction is a problem: a beam of light tends to disperse outwards, and the tighter the beam the more noticeable the dispersion effect.

Continuous wave OPOs require even more accurate phase matching than pulsed lasers.

Laser devices that are intended to emit a laser beam and OPOs are different devices, but OPOs do use light amplification by stimulated emission and are laser-effect devices. Lasers and OPO's both achieve coherent amplification of light through a stimulated process: In lasers, the stimulated process is due to an electronic decay, whereas in an OPO, the stimulated process is due to a parametric conversion arising from the non-linear optical properties of the OPO material. In lasers the emission is stimulated, in OPO's the splitting of photons is stimulated.

Raman lasers work on the principle of an incident pump photon exciting an electron from a ground state to a virtual state (not a real quantum state) which is a quantum of energy higher than the ground state equivalent to the energy of the incident radiation. The electron does not really exist in a virtual state, but instead simultaneously decays from the virtual state down to a natural vibration state—the Raman frequency—which is higher than the ground state. The difference between the ground state and the Raman frequency is the Raman vibration frequency (or Raman shift) of an atom. The difference between the virtual excited state and the natural vibration state is the Stokes radiation emitted photon.

In a stimulated Raman laser the decays are stimulated by the presence of the emitted Raman emissions from neighbouring molecules (virtual to Raman natural frequency state). The efficiency of the conversion of the incident pump radiation to output Raman radiation is limited by the Raman shift (ground to natural Raman state). A 60% quantum efficiency is considered small for a Raman laser. A good Raman laser quantum efficiency is around 90–95%, but this can only be achieved if the Raman shift is small.

Another way of looking at the Raman effect is that as radiation of one frequency passes an atom the atom takes a quantum of energy at its Raman frequency from the photon, leaving the photon with its frequency Raman shifted (same overall energy atom and photon).

Atoms that are already in the excited Raman state can give up their energy and return to ground state, adding energy to the incident pump radiation—adding energy at discrete quantised levels that are a multiple of the Raman natural frequency for the atom. This produces radiation at the pump frequency plus Raman shift. This radiation is Anti-Stokes radiation.

Historically Raman lasers were developed as gas lasers, but then moved to solid state lasers using a carefully grown single crystal. The gain process in solid state Raman lasers is much the same as other sorts of lasers, with the output intensity radiation being equal to the intensity of the original signal radiation times $e^{gI_{pump}L}$. Because a solid state Raman material has a lot more atoms closer together there are more interactions per unit length, and so it is possible to use a shorter length of Raman crystal. Effectively the gain coefficient, g, goes up. It is therefore easier to grow relatively short (e.g. a few cm) crystals.

Raman lasers usually require a high intensity pump source, and so most Raman lasers are pumped by pulsed lasers. In a conventional Raman laser a resonance cavity is usually formed by mirrors at each end of the Raman material. Focusing lenses are often used to increase the pumping intensity within the Raman material. The light intensity where the lenses focus is greatly increased and this means that the Raman effects tends to occur in the region close to the lens focus.

In fact the second mirror (and/or indeed first mirror) is conventionally partially transparent to the Raman radiation to allow a beam to leave the laser cavity, but is reflective for other radiation frequencies.

The overall conversion efficiency of a conventional pulsed solid state Raman laser is rarely more than 50%, despite the high quantum efficiency because of several factors. If one looks at the temporal profile of the beam, the intensity of a pulse rises initially from a level where it is too low to create Raman laser effect (no amplification) to a point where laser effects start, and then later in time it falls to a point where the laser effect ends, again because the intensity in time of the beam is too low. However, there is a ceiling on the peak intensity allowed for a beam—if the beam is too intense it will damage the crystal. There is also a problem with the spatial profile of the beam, which is typically gaussian. Only the central portion of the beam in space is intense enough to create the Raman laser effect, the outer annular area of the beam is typically too weak to create laser Raman effects. Furthermore, the stimulated Raman process takes time to build up. In a pulse width of 15 nanoseconds, with light travelling at about one foot per nanosecond, the reflected cavity Raman light in the light amplification cavity may take ten passes before it is intense enough to efficiently extract power from the pumping beam. Thus, there is only efficient laser amplification in the last five nanoseconds.

It has been known for decades that Raman effects happen in the glass material of glass fibres, but no one has found an attractive commercial use for them. The gain coefficient of the glass is too low to be very useful. There is physical limit to the width of fiber—if the fibre is narrower than the wavelength of the light then the light cannot propagate efficiently through it. There is also a limit to how much power the glass fibre can take before it melts. Raman effect lasers that use a length of glass fibre to amplify the light are known but it is necessary to have kilometres of a length of the glass fibre to make the Raman effect work because of the low gain coefficient. Additionally, the residual absorption of the material is quite high over this length of fibre and this restricts the efficiency and limits operation to wavelengths that have maximum transparency in the glass (i.e. 1.5 μm). Raman effect lasers with kilometres of glass, using the material of the glass to create the Raman effect, are not popular.

There is a window in glass, at about 1.5 microns, with very low absorption. This is a good wavelength for Raman effect lasers, but the gain depends on the wavelength, and the gain coefficient plummets as the wavelength changes.

When growing a single crystal of laser material a few centimetres is the limit that can be achieved reasonably.

The present invention arose from considering Raman lasers and Raman wavelength-shifting techniques, but it may be applicable to other types of laser, and wavelength-shifting devices.

According to a first aspect the invention comprises a photon-emitting device (for example a laser device) having photon emitting material regions (e.g. laser-material regions) which emit photons in use and couplant material regions which operatively couple the photon-emitting regions.

The photon-emitting material may be a laser material, or it may be an OPO material instead of a laser material. However, the vast majority of applications will be with laser.

Thus it is not necessary to have a large single crystal of laser (or photon-emitting) material.

$Ba(NO_3)_2$ (barium nitrate) has been used as a solid state Raman medium for pulsed stimulated Raman scattering lasers. Conversion efficiencies of greater than 30% are possible from the pump into the first Stokes frequency in the visible. The conversion efficiency is limited by the transient nature of the pulsed lasers used to pump the crystal, the damage threshold of the material and also by the limited length available (~10 cm). Barium nitrate crystals are hygroscopic, very fragile and cannot be grown or drawn into optical fibres of any significant length.

However, it has now been appreciated as part of the present invention this material, and also any other material with similar Raman properties, could be formed into an optical fibre of arbitrary length by combining it with a couplant material, for example glass, which has the same refractive index. The couplant material could be a polymer, for example polymethyl methyacrylate (PMMA). Any polymer that is well refractive index-matched and that is not melted by the laser, and does not harm the Raman material particles may be suitable.

A paper of 15th Apr. 1999 in Optics Communications 162 (1999) 191–194 published by Elsevier Science BV discuses the experimental investigation of amplification of a probe beam by stimulated Raman scattering in a powdered sample of $Ba(NO_3)_2$ held in a glass-walled cell. An integrating sphere was used to collect the laser light emitted by the powder and transmit it via a fibre optic to a sensor. The laser effect of the $Ba(NO_3)_2$ was pulsed.

There will in the present invention usually be a large number of laser material regions (photon-emitting regions), which may typically be solid particles of laser materials. There may be hundreds or more, thousands or more, tens of thousands or more, hundreds of thousands or more, or millions or more of the laser material particles or regions. The laser material particles are preferably distributed in a body of couplant material, most preferably with a random distribution. They may have a random orientation, or a generally ordered orientation, for example they may be aligned on a macroscopic scale. This may assist in obtaining optical transparency along a fibre axis. The invention preferably avoids strong bulk scattering of light at the operational wavelengths. If the particles in the body (e.g. fibre) are of optical parametric oscillator material and the device is to operate as an OPO, then they will need to be orientated relative to each other so that they operate constructively and produce coherent, phase matched outputs. Orientation of particles is not necessary for Raman laser operation, where the particles can be randomly distributed and randomly orientated, but it may be desirable to align them. There is preferably a laser-material/couplant material matrix, which is preferably solid. The couplant material may be held in a walled cell (e.g. glass-walled). The refractive index of the laser material and the refractive index of the couplant material may be substantially the same, at a wavelength of laser action, in use of the device. The refractive indices of the couplant material and the laser material may be matched to at least 1, 2, 3, 4, 5, or more decimal places during use of the laser device.

As an alternative, there may be only a few larger particles, or a few tens of larger particles in the glass fibre/matrix body. The particles may have an elongate length, which may be generally aligned with the axis of the fibre or matrix body.

The couplant material may not emit stimulated radiation to any significant extent in use of the device. Alternatively, the couplant material may, in use, emit radiation.

The device is preferably a continuous wave Raman laser device. A pump laser may be provided, and it may be a continuous laser. The pump device may be an OPO.

The laser device may have temperature control means to control the temperature of the laser material and couplant material to assist in refractive index matching. Preferably the laser material/couplant material matrix is in the form of an elongate body provided with elongate surfaces which in use reflect emitted laser light incident upon the surfaces at an angle below a critical angle back into the body, thereby retaining the laser light in the body. The device may comprise a body, preferably an elongate body, of couplant material/laser material matrix having a large number of particles of laser material. The body may have a length to width ratio of at least 20, and possibly of at least 100 or more. The body may comprise a fibre or strand. The length to width ratio could be anything suitable, for example from a flat thin disk to a fibre with a dimension of the order of 1 or 2 μm and a length of several kilometres. The body need not be elongate, and could for example be of any shape, for example cubic, a prism, a lens, a sphere, a solid geometric shape. It need not be solid (it could define or part-define a space). If the product of the pumping intensity and interaction length is high enough the body of couplant/laser material could be used with a pulsed laser source or a CW laser source. It may be necessary to have a more elongate body for CW laser sources, and pulsed laser sources may be better for use with a bulk body.

The body may have a core of laser (or other photon-emitting) material/couplant material matrix surrounded by a sheath or by cladding. The cladding may have a refractive index that is substantially different (at a laser wavelength present in the laser device when it is operational) from that of the core. The difference may be 0.05 or below, 0.1 or below, or 0.2 or below; or more. Preferably the cladding has a lower refractive index that that of the core. The cladding may be a protective cladding, which may in use protects the laser material of the core from contact with the air/its surrounding environment.

The laser material is preferably Raman effect laser material capable of producing Stokes radiation, and typically also Anti-Stokes Radiation, but could alternatively or additionally be a conventional optically-pumped laser material (e.g. Nd:YAG, Ruby, Alexandrite, Fosterite, Ho:YAG, Yb:YAG, Er:YAG, Nd: Glass, Er: Glass, Pr: YAG, Cr:GSGG etc.). The body may have either Raman laser material, conventional laser material, or both Raman and conventional laser material regions. The couplant material itself may be a laser material (or it may not).

Preferably the laser material/couplant material matrix body provides in use a long enough interaction length for the Raman material that the conversion efficiency of the body is significant, and preferably is at least 20%, or at least 40%, or at least 60%, or at least 80% or at least 90%. The arrangement may be such that the conversion efficiency may approach 100% if all of the Raman frequencies (Stokes and Anti-Stokes) are extracted.

The body, or fibre, may have a length of the order of a metre, or metres, or of the order of ten metres or tens of metres. The fibre is preferably 50 metres or less in length, but it could be up to 100 metres, or longer.

The laser device may have a pump laser, preferably a solid state pump laser, and a Raman laser material/couplant material matrix of such length (or with the interaction length arranged such) that light of at least two different colours can be emitted by the body when the device is in use. The two different colours may comprise the pump light and a Stokes emission from the laser material; or light from different Stokes emissions, or Anti-Stokes emissions. Preferably at least two colours are capable of being emitted simultaneously by the body. Tuning means may be provided with the device to tune out a chosen wavelength laser light to leave the other colour or colours emitted by the device.

The laser device may have a plurality of bodies arranged to emit, in use, different colours (or combinations of colours) of laser light relating to different Stokes or Anti-Stokes (or different combinations of Stokes or Anti-Stokes) radiation. The laser device may be capable of emitting 2, 3, 4, 5, 6, 7, 8 or more different coloured laser beams, possibly simultaneously, or alternatively it may be capable of being tuned to emit a selection of its possible wavelengths, possibly one at a time, or possibly more than one at a time. The colours are preferably in the visible system, or at least some of them are. The colours may be from the group: red, orange, yellow, green, blue.

The length of the fibre/body may be such that in use laser light from one Raman emission (or the pump laser) is in the process of being supplanted by a different Raman emission that is driven by said one emission, thereby providing a laser light output of more than one wavelength.

There may be laser material particles of a first kind and laser material particles of a second kind in the couplant material/laser material matrix. The particles of the first kind may be of a different substance from that of the particles of the second kind. This enables a single body to have the different laser materials, preferably Raman laser materials.

Preferably the refractive index of the laser material and of the couplant material are very accurately matched at the pump wavelength and for at least the first Stokes emission wavelength and most preferably at several Raman emission wavelengths. The refractive indices may be matched over a 200 nm wavelength range, or more. They may be matched over the wavelength range 500–700 nm. The refractive indices may be matched over the visible spectrum, for example, from about 400 nm to about 750 nm. Many Raman materials are transparent over a wider range than this, and the refractive indices may be matched over, for example, about 300 nm to about 5000 nm.

The laser material particles may be so small in comparison with the operational wavelength of the laser device (or all operational wavelengths) that substantially no bulk scattering of light from them takes place in use. Any scattering may be either Mie or Rayleigh in form. The particles may have a diameter (or longest length) less than the wavelength of the pump wavelength, possibly around 50% or less, or 10%, or less. It may then not be necessary to match the refractive index of the couplant material (if there are substantially no scattering interfaces), depending on the scattering wavelength compared with the operating wavelengths.

The body may have some particles of Raman (or other laser or photon-emitting) material that are large and which bulk-scatter light and some that are too small to bulk-scatter light. The large and small particles may be of different materials. The couplant may be refractive-index matched to the larger particles, or matched to both large and small particles.

The laser device may comprise a laser material/couplant body, possibly a fibre, for use with a pump laser and an output optics system. Alternatively the laser device may include a pump laser and/or an output optics system.

According to a second aspect the invention comprises a method of producing or detecting laser radiation comprising using a laser body having a plurality of laser material regions operatively coupled together by a couplant material.

The invention may also comprise a method of producing OPO radiation comprising having an OPO body having a plurality of OPO material regions operatively coupled together by a couplant material. The method may be thought of as a method of emitting radiation comprising providing regions of radiation-emitting material in a couplant body or matrix.

The method preferably comprises pumping the body with laser light which causes Raman effect emission from the laser material regions.

Preferably the method comprises using a large number of Raman laser material particles provided in a couplant matrix. Preferably the refractive index of the laser material is matched to that of the couplant material. The particles may be randomly distributed and/or randomly, orientated.

The method preferably comprises producing laser light of more than one wavelength from the same Raman laser material/couplant body by arranging for the body to be such that laser emissions from at least two of the following are produced: pump laser; first Stokes emission; second Stokes emission; third Stokes emission; fourth Stokes emission; subsequent Stokes emissions; first Anti-Stokes emission; subsequent Anti-Stokes emissions.

The method may comprise producing laser light of different wavelengths by having more than one kind of Raman laser material in the body, and using the different Raman interactions of the different materials to produce different wavelength laser light.

The method may comprise arranging for the body to be such that substantially all of the light emitted by the body has a single wavelength.

The method may comprise emitting laser light of more than one wavelength by having bodes of similar composition but of different lengths, or effective lengths, so that they emit different wavelength Raman effect radiation.

The method preferably comprises shortening the length of the body to a desired length chosen to emit a desired Raman wavelength, or a plurality of desired Raman wavelengths. The method may comprise reflecting laser light back along the body so as to have the light make multiple passes through the body.

According to a third aspect the invention comprises a method of manufacturing a laser device comprising mixing Raman laser particles with a couplant material.

Preferably the method comprises having the Raman laser or OPO material present with the couplant whilst the couplant is in a liquid state and then setting the couplant to form a solid body. (e.g. mixing particles of Raman laser/OPO material with a liquid couplant). Preferably the method comprises drawing or spinning a fibre of couplant/Raman material matrix, or a fibre of compliant/OPO material matrix. A cladding is preferably applied to a Raman laser material and couplant matrix body. The cladding may be co-drawn, or co-extruded, with the core, or it may be applied after the core has been formed.

The method may comprise cutting or otherwise forming a Raman laser material/Couplant fibre/body to a predetermined length chosen to achieve a predetermined Raman laser output wavelength.

According to a fourth aspect the invention comprises the use of a glass fibre containing Raman laser material particles in a laser to produce laser light. Preferably the laser light produced is of more than one wavelength.

According to a fifth aspect the invention comprises the use of one or more lengths of Raman laser material/couplant bodies to produce a laser device capable of generating laser light of at least two or three colours.

According to another aspect the invention comprises the use of glass or polymer fibre or body, containing laser material particles or regions in a laser to produce or detect laser light.

The present invention, looked at in one way, is to use an optical fibre to constrain the laser beam and form a laser cavity, and have laser activity/amplification in Raman material provided in the fibre, with the Stokes/Anti-Stokes radiation being partially confined within.

In another embodiment the couplant material may itself be a laser material (for example Er: glass or Nd: glass). Thus both the couplant material and the laser material may lase. The laser material may modify the light emitted by the lasing couplant material, or, vice-versa, the lasing couplant material may modify the light emitted by the laser material regions. For example, a pump laser (e.g. diode laser source) could pump a conventional fibre laser, but embedded in the fibre laser could be Raman particles which could shift its fibre laser wavelength in situ so that the output would be at the Raman emission wavelength(s).

The invention may be applied to a photonic bandgap device, or photonic crystal device. These may enable the production of a large core diameter fibre that is still single mode. The device may be adapted to be applied to an article so as to inhibit the production of counterfeit articles.

Photonic crystal fibres are discussed in Birks, T. A.; Knight, T. C.; Russell, P. St J., "Endlessly Single Mode Photonic Crystal Fibre" in Optical Letters, volume 22, page 961, 1977. Photonic band gap fibres are discussed in R. F. Cregan; B. J. Morgan; J. L. Knight; T. A. Birks, P. St J. Russell, P. J. Roberts, D. C. Allan, Science, volume 285, page 1537, 1999. Briefly, and broadly, put a photonic crystal fibre has a solid core with lots of holes, and a bundle of capillary tubes running parallel with the core. A photonic band gap fibre has a hollow centre with an air gap.

Since making the invention a search has been conducted and this found: GB 2 289 159 which discloses a doped glass laser, doped with semi-conductor microcrystallite e.g. cadmium; U.S. Pat. No. 5,717,517 discloses a pumped optical amplifier which absorbs light; U.S. Pat. No. 5,434,878 discloses a laser paint using strong bulk scattering of light.

Embodiments of the invention will now be described by way of example only with reference to the accompanying drawings of which:

FIG. 1A shows a detail of the light refraction within the fibre;

FIG. 5 is a table shown some materials that are know to have a Raman laser capability and that may be suitable for use in the invention;

FIG. 6 is another table showing estimated Raman gain coefficients for excitation at 1064 nm for different materials;

Figure 17:
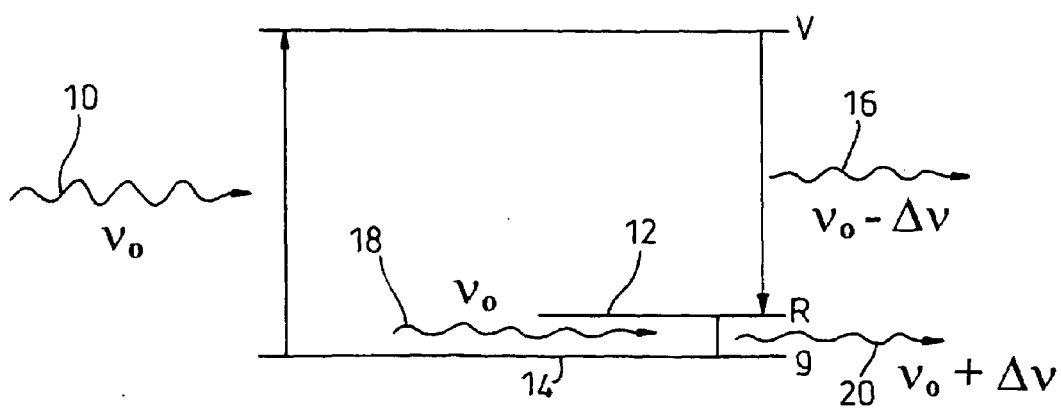
FIG. 17 shows the principle of Stokes and Anti-Stokes emissions.

FIG. 17 illustrates schematically the principle of Raman shifts. An incoming photon 10 encounters a molecule (not shown) and the molecule has a natural excited fabrication frequency 12(R) at a higher energy level than its ground state 14(g). The molecule, or an electron of the molecule can be considered to be excited to a virtual pseudo excitation state V from which it instantaneously decays to the Raman excited vibration state 12, emitting a photon 16 with an energy that is a quantised amount less than the incident photon 10 (less by the difference in energy between R and g). Thus light of one wavelength (photon 10) goes in and light (photon 16) of a different longer wavelength comes out. This is Stokes radiation.

Similarly if a photon 19 encounters an atom in its excited Raman shifted state R it can gain the Raman-shift energy and be absorbed/re-emitted at a higher frequency (photon referenced 20) with the atom decaying back to its ground state. This is the Anti-Stokes radiation. It will be appreciated that having a lot of photons of the correct energy stimulates the Raman effect. Light Amplification by Stimulated Emission can be achieved if the conditions are right.

Figure 1:
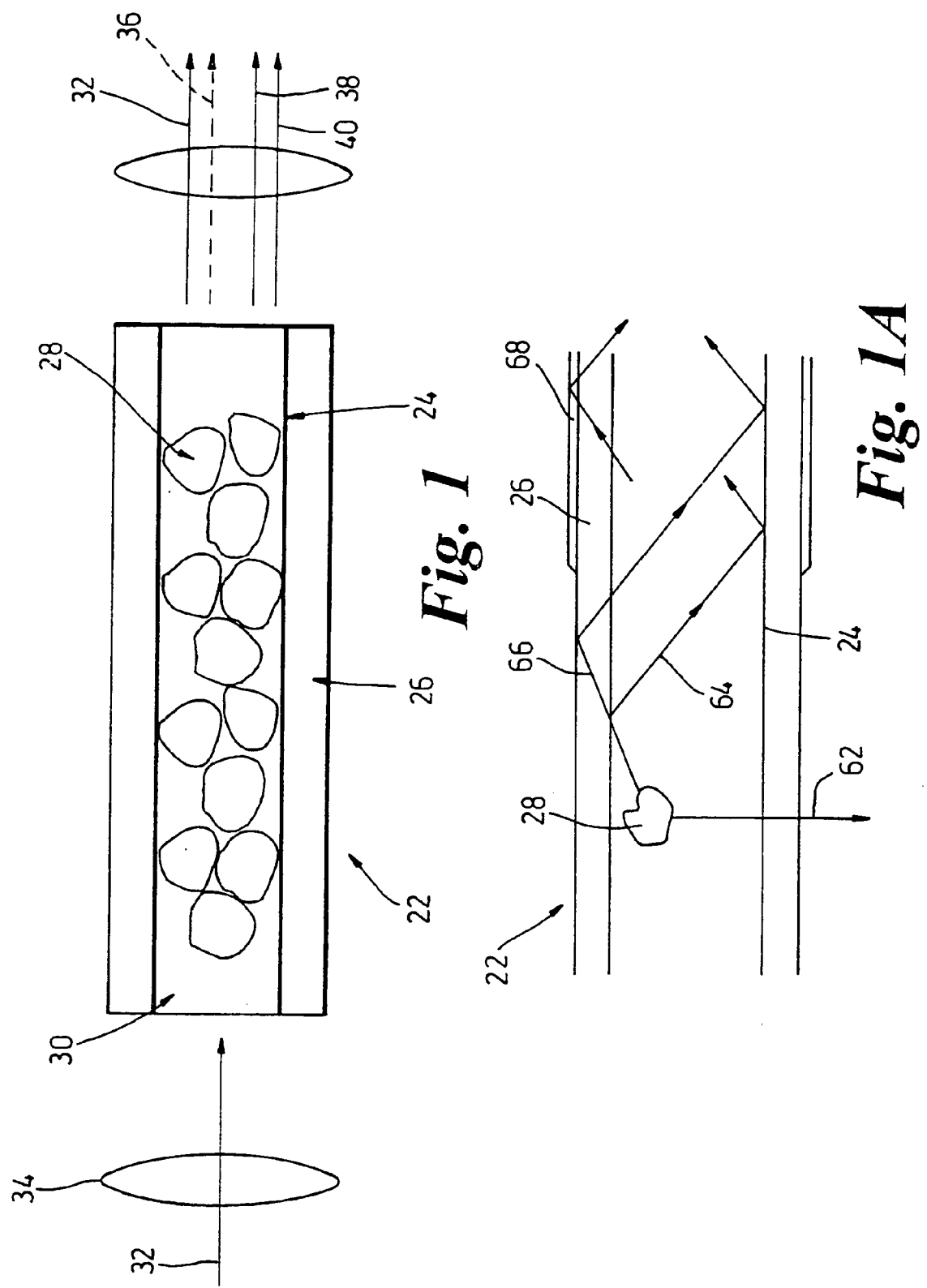
FIG. 1 shows an optical fibre in accordance with the invention.

FIG. 1 shows schematically a laser glass fibre 22 having a cylindrical core 24 surrounded by an annular cladding or surround 26.

The core 24 comprises Raman emission/Raman laser particles 28 held in a glass matrix 30. The refractive index of the glass 30 is the same as that of the particles 28 to within three decimal places at the optical wavelength of interest, say 580 nm (yellow). A suitable glass may be BaK 1, but it may need to be blended with other glasses and/or be temperature controlled to achieve the desired match of n to the desired accuracy.

The particles are in the example of FIG. 1 Barium nitrate $(Ba(NO_3)_2)$ crystals. They have in this example a size of about 1 µm.

The cladding 26 is a glass with a different refractive index (n), typically a lower n. In this example a refractive index is a few percent lower than that of the glass-Raman matrix (GRM).

FIG. 1 shows input, pump laser light 32 input to one end of the glass fibre 22, via a lens 34. For a Barium Nitrate Raman laser a suitable pump wavelength would be 532 nm (green). When the pumped laser light is travelling in the glass it encounters the $Ba(NO_3)_2$ particles/crystals and refraction/reflection is virtually eliminated by the very close match of refractive index. In the $Ba(NO_3)_2$ Stokes radiation 36 is produced at a first Stokes wavelength 563 nm (yellow). As the yellow light 36 encounters $Ba(NO_3)_2$ it acts as a pump frequency for a second Stokes emission 38 (at 599 nm, orange). The orange light also acts as a pump frequency for a third Stokes emission 40 (at 639 nm, red), and so on. It will be appreciated that once an initial portion of the optical fibre 22 has been traversed by the light, there will be at any point in the length of the fibre pump light, first Stokes light, second Stokes light, and third and higher order Stokes light. The intensity of the light at any allowable frequency will also be determined by the absorption of the glass/Raman material at that frequency, and the efficiency of the various Stokes emissions. At parts of the glass fibre remote from the pump laser input practically all of the light will have been converted to other frequencies.

A suitable diameter for the core 24 is about 2 µm to 5 µm (depending upon the refractive index difference between the GRM core and the cladding). A suitable radial thickness for the cladding 25 is a few 10's of µm.

The fibre 22 produces a laser with a power of the order of 1W, but depending upon the core materials it is likely to be possible to achieve a power of the order of 10W with a 2 µm diameter core. Thus, without orientating the Raman material particles in the fibre a coherent laser output of significant power is produced.

Thus the GRM fibre of FIG. 1 provides a way of producing several colours of laser light (at different Raman lines).

It will also be appreciated that Anti-Stokes radiation produced in the laser $Ba(NO_3)_2$ can convert the green pump laser light to blue first Anti-Stokes (504 nm). Similarly, second, third, and together Anti-Stokes radiation may conceivably be produced.

The number of particles and intensity of incident light determines whether laser effects occur in the fibre 22. If the initial intensity is too low, or there are not enough Raman—laser generation particles, or if too much light leaks out before stimulated Raman action takes place, then the fibre may not efficiently convert the pump light into Raman wavelengths.

Figure 2:
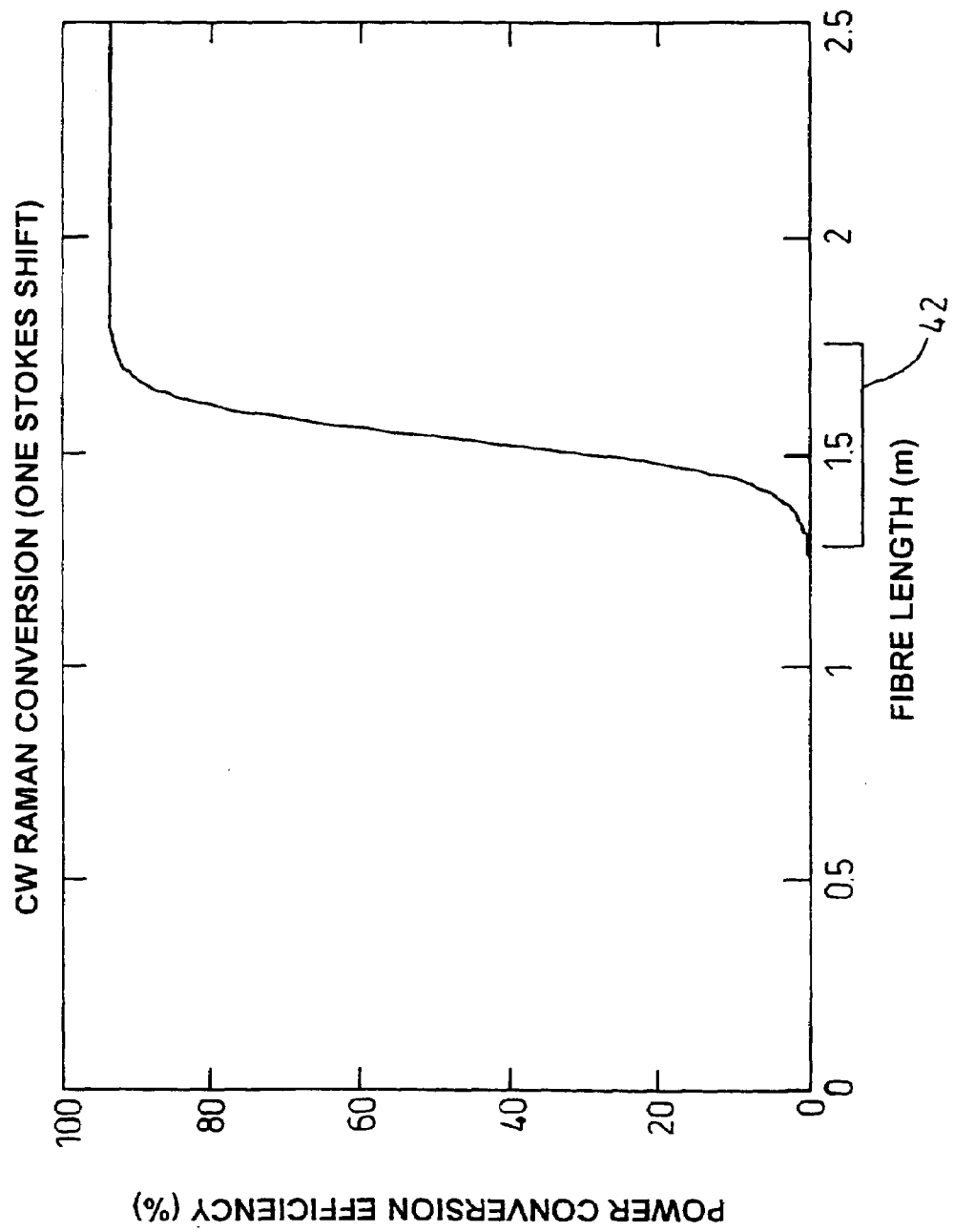
FIG. 2 shows an estimated conversion efficiency for the device of FIG. 1.

FIG. 2 shows the estimated Raman conversion efficiency for a 1W 5 µm core diameter fibre with $Ba(NO_3)_2$ crystals in the Glass-Raman-Matrix (GRM) and shows that with an interaction length below about 1.25 m not much happens. In the range 1.25 to 1.75 m interaction length the conversion efficiency is sensitive to the interaction length. Above an interaction length of about 1.75 m the quantum conversion efficiency theoretically approaches the quantum limit. Thus, in this example, it is desirable to have an interaction length of about 1.75 m or move if high conversion efficiency is desired (interaction length is the same as fibre length if there are no reflections from end faces of the fibre).

It may also be desirable in certain applications to operate the laser at the region, referenced 42, where the conversion efficiency is sensitive to changes in the interaction length. This is discussed later.

Figure 3:
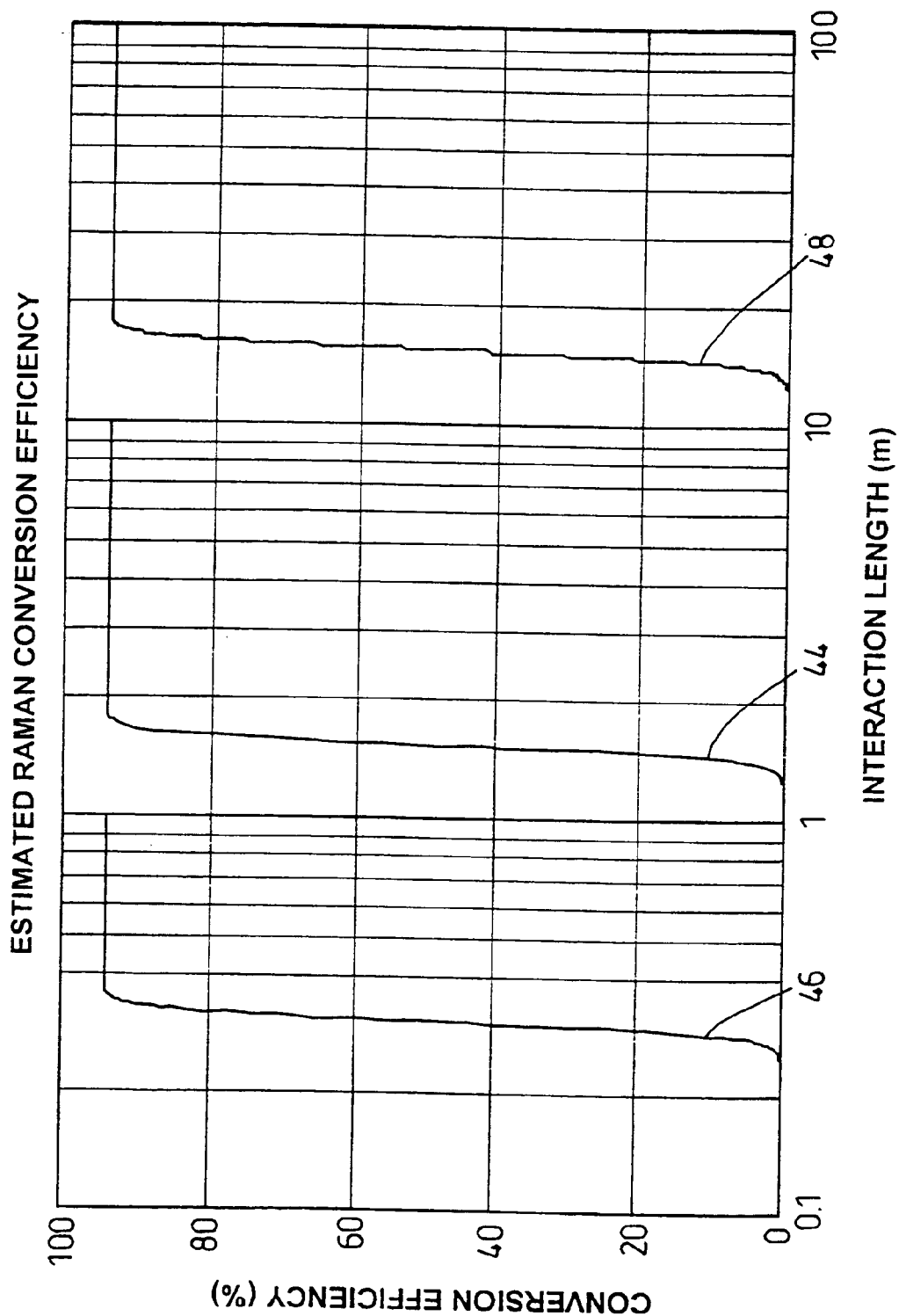
FIG. 3 shows a series of estimated conversion efficiencies for the device of FIG. 1 but pumped with different power pump lasers.

FIG. 3 shows calculated conversion efficiency with interaction length for the optical fibre of FIG. 1 pumped with different intensity pump lasers. Line 44 corresponds to a 1W pump laser (as in FIG. 2); line 46 corresponds to a 5W pump laser; and line 48 corresponds to a 100 mW pump laser. The Figure shows that the lower the power of the pump laser the longer the interaction length that is required to approach maximum Raman Conversion efficiency.

The formula used to calculate predetected Raman conversion efficiency with interaction length is a standard formula.

Each particle 28 encountered by radiation is a chance to scatter. Even the best matching of refractive index of Raman material 28 to coupler material 30 will not be absolutely exact over a wide range of frequencies. The larger the number of particle-coupler/carrier interfaces the more scattering there will be and the lower the transmission efficiency. The number of particles is relevant here, and not necessarily their size (but see later). The concentration of particles is not normally particularly relevant in comparison with the number of particles.

Figure 4:
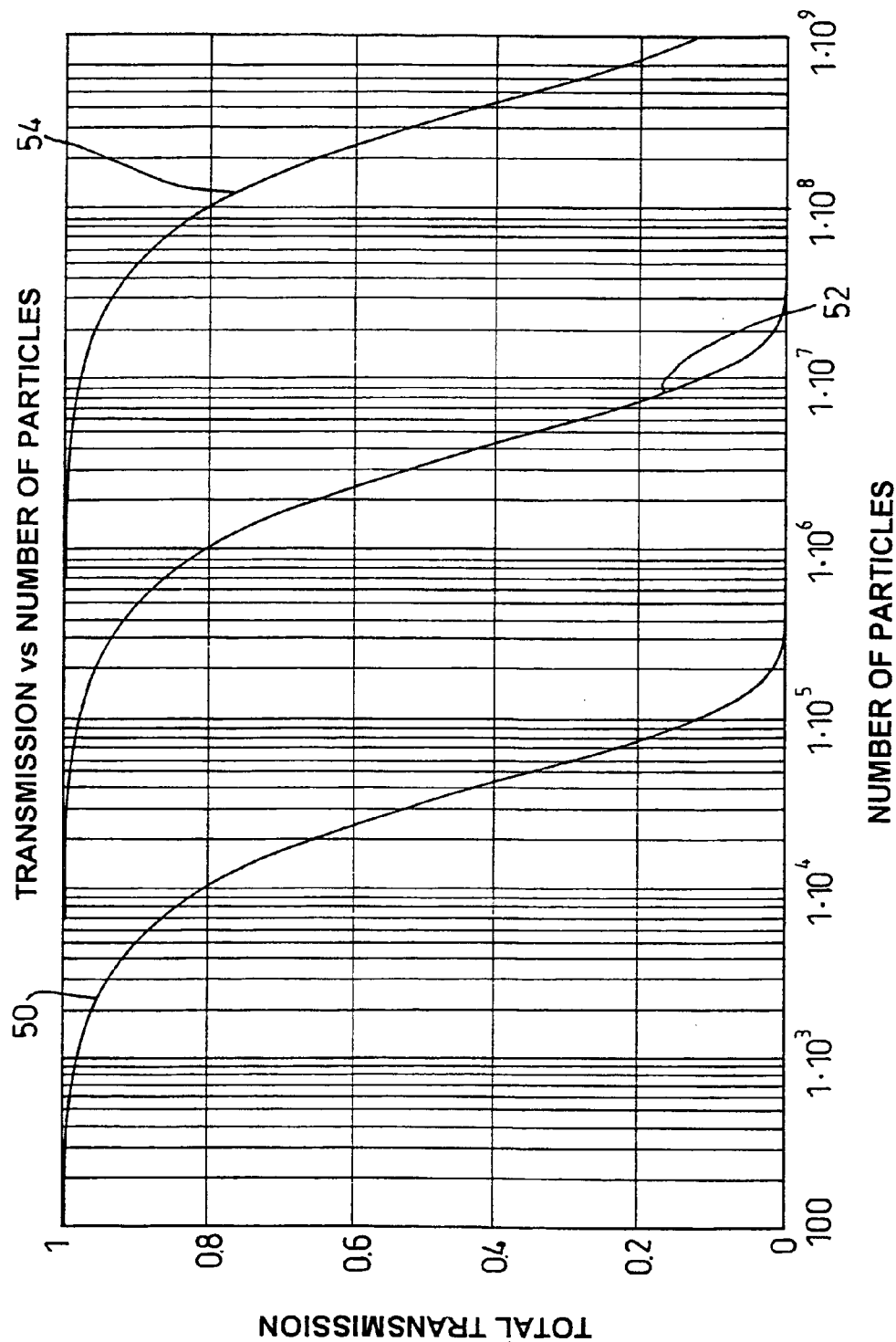
FIG. 4 shows how the transmission of the device of FIG. 1 varies with the number of particles in the fibre, for three different sizes of mis-match between the refractive indices of Raman radiation emitting particles and a couplant matrix.

FIG. 4 shows a calculation showing the total transmissivity for the fibre of FIG. 1 and how it varies for number of particles, and with the mis-match between the refractive index of the Raman material and the refractive index of the couplant/particle carrier medium. Curve 50 shows transmission vs number of particles for a difference in refractive index of 0.01, curve 52 for a difference in refraction index of 0.001, and curve 54 for a difference in n of 0.0001. The more particles there are the more closely the refractive indexes need to match.

In practice the particles will not be spherical, but the curves will still be generally as shown, and FIG. 4 still illustrates the general relationship between the $\Delta n$ permitted and number of particles permitted before transmission is dramatically reduced.

FIG. 5 shows a list of materials which could be the Raman laser material. It is not an exhaustive list. It will be noted that the Raman particles could be single crystals, but they do not necessarily need to be. They could be particles of polycrystalline material.

FIG. 6 shows Raman information for a further list of materials which could form the Raman material.

Figure 7:
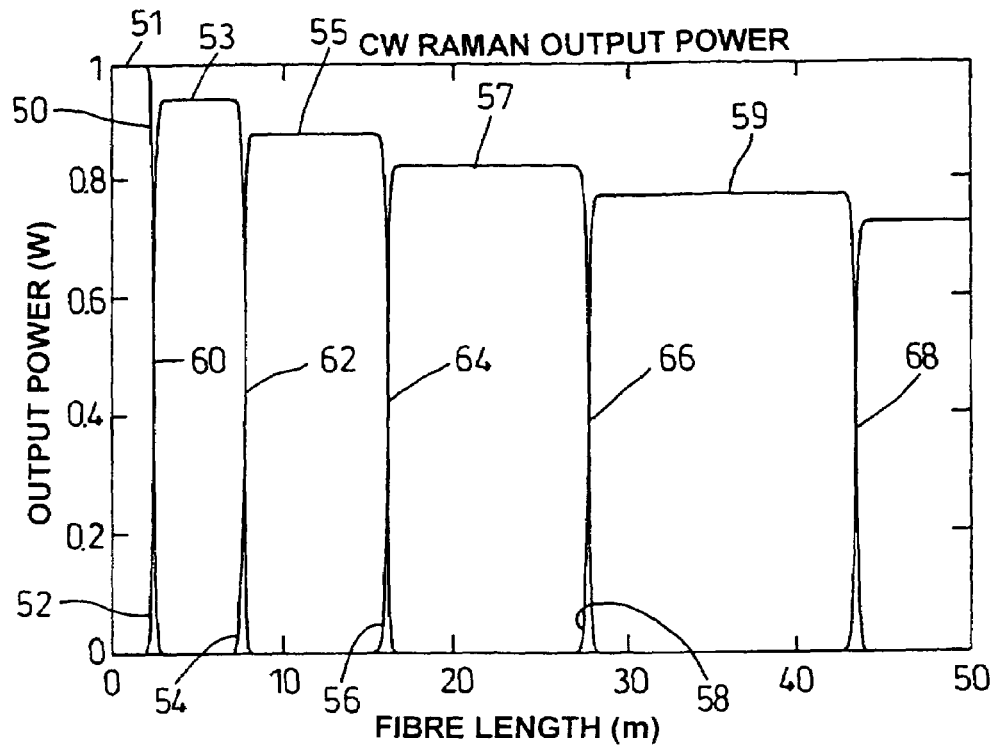
FIG. 7 shows output power vs fibre length for the device of FIG. 1.

FIG. 7 shows a calculated continuous wave Raman laser power output with length of fibre, and indicates the wavelength of the output at the fibre length and power in question. It is for the arrangement of FIG. 1 with a 1W pump laser, and $Ba(NO_3)_2$ crystals (enough of them to generate stimulated Raman light).

Line 50 indicates the pump input laser at 532 nm. For a fibre shorter than about 2 metres the output light is practically all pump light, with no substantial Raman effect taking place. This is referenced as region 51. As the pump power falls off with length the first Stokes emission, referenced as 52, ramps up so that with a fibre of length about 3 to about 7 m the output of the fibre is substantially completely 1st Stokes (563 nm), referenced 53. The intensity of first Stokes radiation transmitted tails off with length of the fibre as 2nd Stokes radiation (referenced 54) takes over, and from about 8 m to 16 m the output is substantially all 2nd Stokes frequency (about 599 nm), referenced 55. Third Stokes radiation, referenced 56 takes over and from about 17 m to 26 m the output is substantially all 3rd Stokes radiation (639 m) referenced 57. Similarly Fourth Stokes radiation, 58 takes over as the fibre gets longer and from about 28 m to 44 m the output is substantially all 4th Stokes (referenced 59).

FIG. 7 is not really totally accurate since it ignores Anti-Stokes emissions, which will introduce still further colours and reduce the powers shown for the transmitted Stokes radiation. However, FIG. 7 does show that at certain lengths particular wavelengths are transmitted/emitted strongly, whereas other wavelengths fall to practically nothing. It also shows that at certain lengths it is possible to get light emitted having two different colours (and with Anti-Stokes, probably 3 or 4 colours, or more, from the same length fibre).

It will also be noted that when the fibre is certain lengths where one frequency light is beginning to laser the next Stokes emission e.g. at about 2.5 m, 7.9 m, 16.3 m, 27.9 m, and about 44 m), there is significant output power for 2 different frequency light beams. Such transitional regions are referenced 60, 62, 64, 66, 68. It may be desirable to arrange for the length of the fibre to be such that at least two colours are emitted.

FIG. 7 is for a core diameter of 2 μm and a "fill factor" of 0.1, i.e. 0.1 of the volume of glass in the core is replaced with Barium Nitrate.

Figure 8:
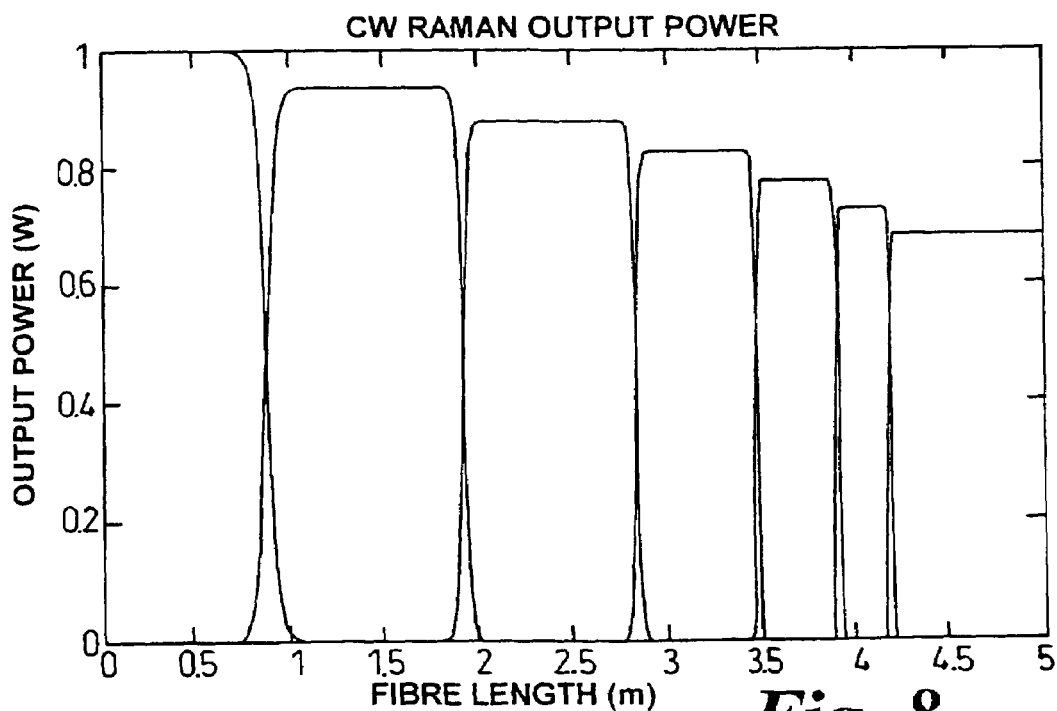
FIG. 8 shows output power vs fibre length from the device of FIG. 1, but with a partially reflective coating at the exit of the fibre and with a 100% reflective coating at the entrance of the fibre (reflectivities refer to the Raman wavelengths, and not the pump)

FIG. 8 shows output power vs fibre length for a fibre with a partially reflective coating at the exit of the fibre and a 100% reflective coating at the other end (the entrance to the fibre), reflectivity being at the Raman wavelengths. The partial reflectivity coating is chosen so the reflectivity increases as the Raman wavelengths increase. This increases the "effective length" of the fibre for each successive Raman generated wavelength. This shortens the required length of fibre to reach the "nth" Raman line.

A benefit of cladding is that it protects the GRM, and the Raman material in it, from the external environment. Some Raman materials are hygroscopic and could deteriorate if they were allowed to come into contact with air.

Another benefit of the cladding is that it helps to control the propagating optical mode for any given core diameter. This is achieved through the refractive index mismatch between the core and cladding.

It is worth mentioning at this point that the refractive index of materials at a particular wavelength typically varies with temperature (and strain). For example temperature and strain can alter the lattice spacing of crystalline materials, and that alters their refractive index.

Thus if there is not quite a match of refractive index to the required degree of accuracy between two materials at one temperature, the temperature can be changed to get a better match. The rate of change of n with temperature for two different materials is typically different for each material so that it is often possible to find a temperature at which their refractive indices are matched.

Furthermore, this idea can be used to match, or more closely match, the refractive induces of three (or more) different materials (see later). Careful control of materials and/or temperature, and/or strain can be used to match for 2, 3, 4 or more different materials over a range of operating wavelengths, to within a predetermined degree of accuracy.

Figure 9:
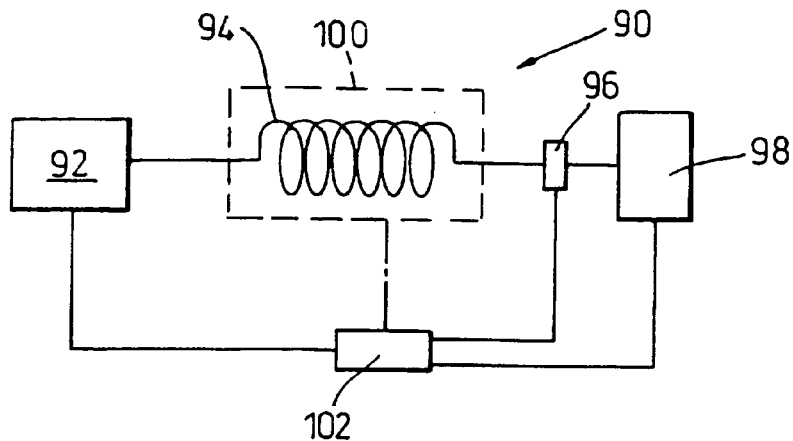
FIG. 9 shows schematically a laser using the device of FIG. 1.

FIG. 9 shows schematically a possible laser unit 90 for the entertainment industry, for example a laser for producing a light show such as might be found at a concert, in a theatre, at an outdoor event, in a disco etc. The laser 90 has a primary pump laser 92, for example comprising a solid state continues wave diode or diode-pumped laser with a power of say 0.1 W to a few Watts, or tens of watts, a laser device 94 comprising a coil of optical fibre as shown as FIG. 1; a colour selector 96, an output display or output optics unit or module 98, an optional temperature control unit 100, and a control processor or computer 102.

The laser 90 has its device 94 such that it is operating in one of the transition regions 60, 62, 64, 66, 68 shown as FIG. 7 and therefore outputs laser light of at least two colours (e.g. green and yellow, transition 60; yellow and orange, transition 62; orange and red transitions 64).

The colour selector 117 can either pass both colours/more than one colour, or act as a filter passing more or less of a particular colour or colours. In this way the laser beam can change from all one colour to all another colour, and to colours in between (by blending/proportioning the transmitted beams). The laser 90 is therefore tunable, or multi-line. Optical display unit 98 projects the beam to make whatever patterns/display is required. The temperature control unit 100 may not be provided, but is present in the example shown. It is provided to keep the coil 94 at the correct temperature so that it is operating at a temperature which achieves refractive index matching of the laser material and the couplant material. The coil may possibly be arranged so as to be operating in a transition zone, 60, 62, 64 etc. Alternatively the coil may be arranged to have an operating regime away from the transitional region. The unit 100 may be capable of heating and/or cooling. The controller 102 controls the operation of the components 92 to 100. It may be programmable. It may have a number of predetermined displays programmed in, and the user may be able to select between them. A graphical or keyboard interface may be provided with the laser 90, or a port for connection to a PC or other input means (e.g. telephone line) may be provided.

Figure 11:
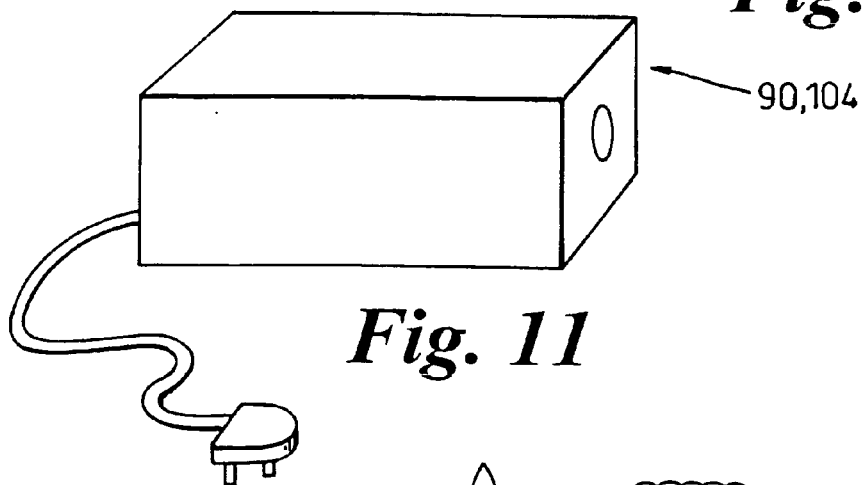
FIG. 11 shows schematically the external view of the laser of FIGS. 10 or 11.

The laser unit 90 is also shown in FIG. 11 and requires only plugging in to a domestic power supply (240 volts, 50 Hz in the UK) rather than a special industrial 3-phase electricity supply, and does not require coupling to a water supply fan water cooling)because it does not require water cooling). This is because the pump laser is now not a high-power pulsed laser requiring water-cooling, but is instead a laser that does not require water-cooling (e.g. a CW Raman laser).

Figure 10:
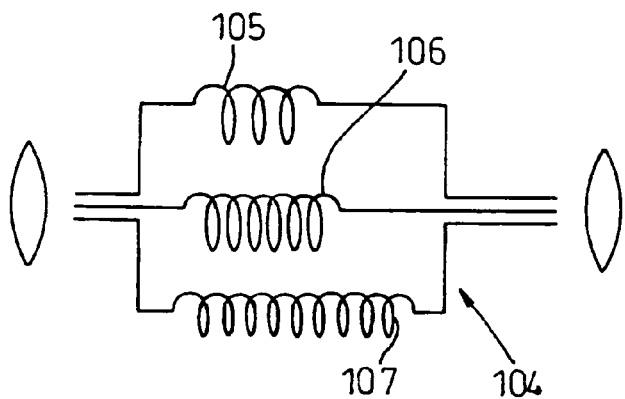
FIG. 10 shows schematically an alternative laser device.

FIG. 10 shows schematically a modified laser unit 104 which is similar to that of FIG. 9 but is capable of producing a greater range of colours (output wavelengths). Thus is achieved by the laser device 94 having a plurality of different lengths of fibre optic, referenced 105, 106, 107, tuned to produce output Raman laser light of different frequencies. Each length of fibre optic has Raman laser material in it, retractive-index matched to a couplant material/glass, and has its length chosen to produce light either at a plateau 51, 53, 55, 57 etc. (single colour) or at a transition 60, 62, 64, 66 (more than one colour). Thus if the lengths of those fibres are chosen appropriately it is possible to produce from a single pump laser light of the pump frequency and the first, second, and third Raman-shifted frequencies. It may be preferable to have each fibre producing light at a maximum laser output power for a particular wavelength of light, or it may be durable to have the fibres a length such that they are at a transition point, or have a mixture of fibres at a plateau and at a transition point. The fibres may be pumped sequentially during tuning, or they may all be pumped simultaneously (i.e. share the pump beam) and the output tuned using 96. For the case where all are pumped simultaneously, the fibres may be either physically separate, or optically joined at the entrance and/or exit ends.

As mentioned earlier, Anti-Stokes emissions will make the position more complicated than the position shown in FIG. 7, but there will still be lengths of fibre which are tuned to produce predominantly one wavelength light, or a mixture of 2 (or more) wavelengths of light at usable intensities.

Figure 12:
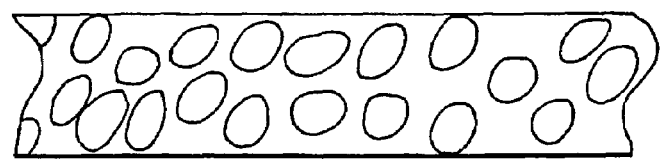
FIGS. 12 and 13 shows alternative fibre optics.

It will be appreciated that a fibre, or Raman material—coupler matrix body, could be provided without cladding. This is illustrated in FIG. 12.

Figure 13:
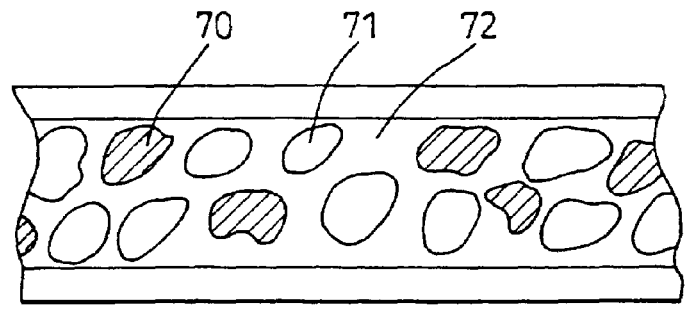

FIG. 13 illustrates another idea: having particles of two different Raman materials, referenced 70 and 71, in a matrix/couplant 72 (with or without cladding). This will enable a single fibre of a single length, at a single temperature, to produce two different wavelength first Stokes emissions. Furthermore if one Raman material (M1) has in isolation Stokes emissions M1S1, M1S2, M1S3 etc. And a second Raman material, M2, has in isolation Stokes emissions M2S1, M2S2, M2S3 etc. then the M1S1 radiation can act as a pump for the M2S1 emissions pumped by a different frequency, which will give a different colour Stokes emission from M2—M2S2 (M1S1$_{pump}$), and vice versa—the M2S1 radiation can pump M1 stokes emissions to give a different frequency M1S2 (M2S1$_{pump}$). The number of colours possible proliferate rapidly, as the second and subsequent stokes emissions of each material provide a different frequency pump frequency for each other. With the Anti-Stokes radiation brought in as well it is possible to get a wide range of colours from only two Raman materials.

It is possible, of course, to provide more than two Raman materials in a Raman-couplant-matrix.

Figure 11A:
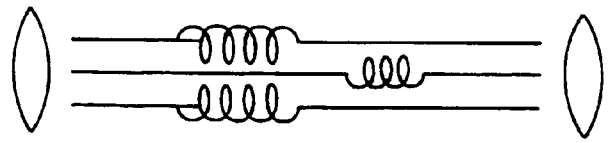
FIG. 11A shows a further laser device.

A laser device may have different Raman-couplant matrix bodies, with different n, to increase the range of colours it can produce. For example, FIG. 11A shows a laser unit having 3 different refractive index GRM fibres, each of a different length, but two or more could be of the same length. The device of FIG. 11A, or of FIG. 10, may be switchable to use different fibres.

It will also be appreciated that the length of a fibre, or Raman-material/couplant body for a more generalised term, not necessarily a fibre, can be effectively increased by having the light pass through it repeatedly. This can be achieved by putting reflectors or reflective coatings at the ends of the body/fibre. The reflectors may reflect at a chosen wavelength, and/or have at least partial transmission at another chosen wavelength (or at least one of them may be partially transmissive at a chosen wavelength to output a laser beam). FIG. 8 shows the effect of adding reflective coatings to the same fibre used in FIG. 7. The effect is to dramatically shorten the length of fibre needed to obtain any given Raman wavelength.

Figure 14:
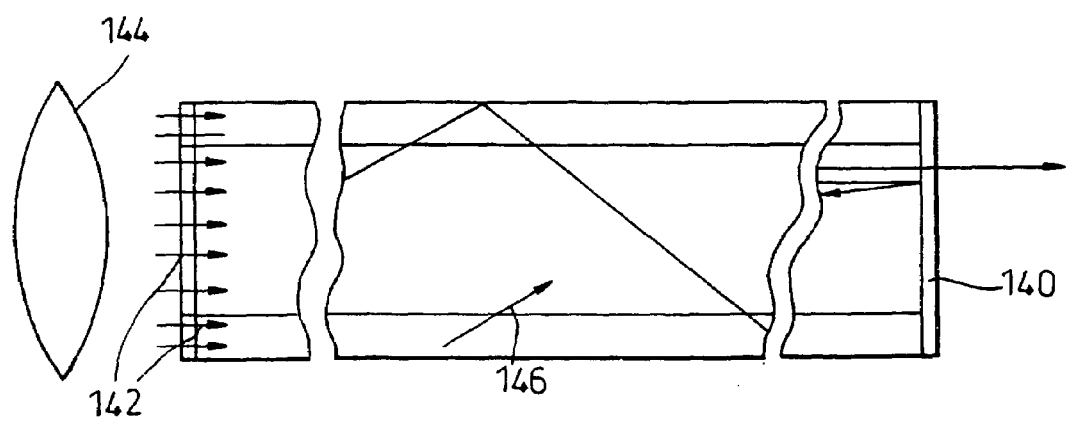
FIG. 14 shows, with exaggerated angles, some features of the fibre of FIG. 1.

FIG. 14 shows a number of features, one of which is a partially reflective coating 140 at the exit end (and a 100% reflective coating at the entrance end).

One problem encountered in fibres that generate a laser action inside themselves, for example the known km long all-glass laser devices is that it can be difficult to get enough initial pump laser intensity into the fibre to get efficient laser action without melting the glass.

With the arrangement of FIG. 1 it is possible to input initial laser light through the cladding 26, as well as the Raman-laser material-containing core 24, thereby reducing the intensity of light in the core at early parts of the fibre. (It is known per se to have a fibre with a core and cladding and introduce light into the cladding.) Light in the cladding does scatter into the core along the length of the fibre, but by then the intensity in the core has been reduced by out-scattering and so no part of the fibre gets too high an intensity of light to cause it to melt. FIG. 14 illustrates inputting pump laser light, referenced 142, into both the core and the cladding possibly using a lens 144, and shows a cladding transmitted photon 146 entering the core 1 having been carried predominantly, or at least on part, by the cladding. It may be desirable in some circumstances to introduce the majority of, or substantially all of, pump light via the cladding.

There is also a coating at the left had end of the fibre of FIG. 14 that is transmissive to pump wavelength light but 100% reflective for Stokes radiation.

Figure 15:
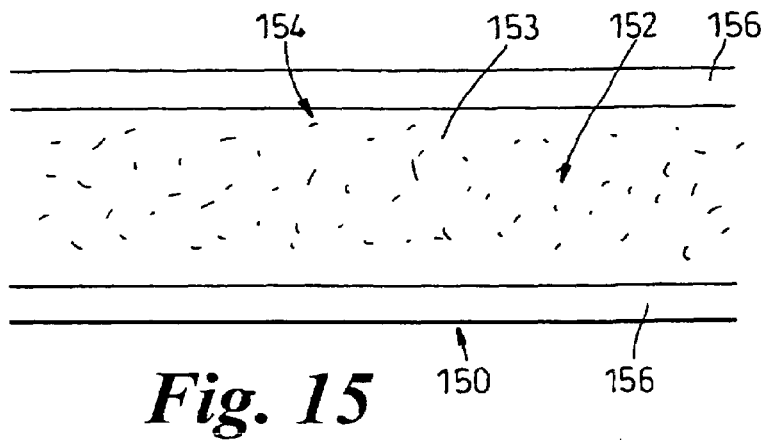
FIGS. 15 and 16 show further alternative fibres.

FIG. 15 illustrates an alternative glass fibre with Raman laser material in it. This time the Raman material is present in a form that has particles that are so small that they do not bulk-scatter light above a certain wavelength, such that Rayleigh scattering occurs. Thus if the Raman material particles are sufficiently small, bulk scattering should not take place. In this regime refractive index matching may be less stringent, and it could be arranged to have small particles held in a glass fibre, or other couplant material.

FIG. 15 shows an optical glass fibre 150 having a core 152 comprising glass 153 with Raman material dust or particles 154 and cladding 156. An alternative is envisaged with no cladding. The Raman material particles are so small they do not scatter the light significantly at the pump and Raman wavelengths. Another alternative is envisaged with cladding/retainment tube, but no carrier matrix for the particles of Raman material.

Figure 16:
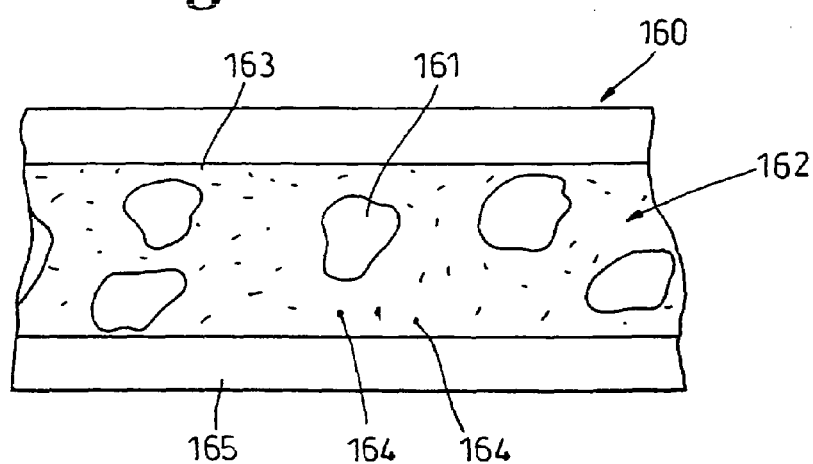

FIG. 16 shows an optical fibre 160 with a core 162 having large particles of Raman material 161 in a glass matrix 163. Small particles 164 of a different, or possibly the same, Raman material are also held in the glass matrix. Glass cladding 165 is provided. The small particles may be above or below the scattering size.

It will be appreciated that although the specific embodiments have shown the glass fibre itself comprising a laser cavity, the glass-Raman matrix, or Raman-couplant matrix (or indeed fine Raman particles in confinement) could be used in a resonant cavity of a conventional laser.

Furthermore, the light may make multiple passes through the Raman material—containing body, or it may make only a single pass.

A further feature is that it may be desirable to introduce pump laser light into the Raman-containing body/fibre with a spatial distribution that is deliberately non-gaussian. If the fibre has a large enough cross section it can support multimode wave propagation. It may be desirable to propagate second and/or third modes (or higher) either in addition to gaussian, or instead of gaussian. The higher order modes will allow greater optical intersection angles within the fibre, which may assist with the generation of Anti-Stokes light through 4-wave mixing processes. 4-Wave mixing is a coherent process, and owing to the natural dispersive properties of the core, an angular intersection of the internal light rays is needed to ensure correct phase-matching for the 4-wave mixing process.

By adding barium nitrate (or other Raman materials), possibly as a fine powder, to an index matched glass and mixing thoroughly, providing the melting point of the glass is lower than the melting point of the barium nitrate (865° K.), it is possible to form a laser optical fibre which is capable of creating laser light. For Stokes generation, there are no phase matching requirements or polarisation issues with barium nitrate and so the crystal particles can be arranged at random orientations within the glass host. In one embodiment the packing density of the particles should be as high as possible and the particle size should be as large as possible for the required size of optical fibre. 2 µm particles at high density should allow a single mode fibre to be made for use in the visible spectrum, without risk of the particles bridging the fibre core and weakening the structure. The refractive index match must be very good, otherwise the fibre will experience high scattering losses. The index match must extend over a wavelength range sufficient to include the pump and generated Stokes (multiple Stokes) lines.

It may be possible to micro-crystallise out the Raman material directly from solution in the glass, i.e. dissolve the Raman material in molten glass, then by controlled cooling of a super-saturated solution, micro-crystals of the Raman material would form within the bulk glass.

The Raman material may be added as a powder and be dissolved, or not be dissolved.

Barium nitrate has a relative small Raman shift (1047 cm$^{-1}$) which makes it a good choice for this application. At a 532 nm pump wavelength (green), the first, second and third Stokes wavelength are 563 nm (yellow), 599 nm (orange) and 639 nm (red). In a multimode optical fibre, which effectively has internal focusing from reflections in the fibre wall, Anti-Stokes generation may become possible, leading to a 504 nm (blue) output from the 532 nm pump (the focusing within the fibre increases the intensity at certain points, and allows phase-matching for Anti-Stokes generation). Other solid state Raman materials which might also be suitable for inclusion into a glass host are $CaCO_3$, $Pb(NO_3)_2$, $NaNO_3$ and $KNO_3$. Furthermore, diamond is considered potentially highly suitable because of its excellent stability and thermal properties—the power limiting factor would be the melting point of the glass. Additionally, diamond has a Raman efficiency which is higher than found in most other solid materials (see FIG. 5).

A glass-Raman matrix (GRM) could be used either in bulk as a conventional solid state Raman device for use with pulsed lasers, or as a fibre for use with CW lasers. In bulk, the material should allow easier scaling to higher powers and, if coated in a layer of barium nitrate free glass (or other protective coating), be non-hygroscopic.

In a fibre form, the cladding layer should prevent any hygroscopic degradation of the material. In both the bulk and fibre forms, the GRM could be used as a Raman generator (single pass use) or as a Raman oscillator with feedback at the pump and Raman wavelengths. In the generator mode, preliminary calculations have suggested as indicated earlier that pump to Stokes conversion efficiencies approaching the quantum limit could be achievable with a few 10 s of metres of single mode optical fibre GRM. If the fibre is indeed single mode at the Stokes wavelength, then diffraction limited beam quality should be obtainable by simply recollimating the Stokes emission from the end of the fibre.

A further advantage of this approach is that it may allow Raman generation to be combined with the emerging technology of photonic bandgap structures. In these, the physical dimensions of the material could be made very large, while still preserving the signal mode characteristics of a conventional optical fibre. A GRM photonic bandgap structure could allow the GRM to be scaled to very high CW optical powers.

It is believed possible to produce a CW laser having a power of hundreds of Watts, and possibly several, tens, or hundreds of kW.

As will be appreciated, one main idea is to use glass as a host and to provide spatial confinement, but to use particles within the glass to create the Raman effect/amplification. It is important in some embodiments to match the refractive index for the wavelengths concerned of the Raman effect material and the glass.

Areas where Raman effect materials are being explored include use of Raman particles in paints, and in dyes—for example for anti-counterfeit protection. Protection for a matrix of couplant material with Raman effect material in it is sought, and for particles having on them an amount of the matrix material. The matrix may comprise a layer or a paint applied to an anti-counterfeit article.

The Raman material particles in the glass matrix can either be single crystals, or polycrystalline materials.

It is possible to put effective coatings on the end of the glass fibre to select the frequency of output light—tuned to a signal wavelength for output (or to exclude certain wavelengths). The end coating can also be used to reflect light backwards and forward in the fibre so as to get multiple passes through the fibre, and increase the laser effect. Different Stokes lines see a different effective length of the fibre, depending upon their frequency, since the reflective coatings can be frequency dependent. In this way it is possible to achieve different intensity control.

Other areas where a glass fibre Raman laser could be used include material processing, and projection television—for example it could be possible to output laser light of three different colours red, blue, green, and have no lens.

A laser diode may be provided associated with or integral with the fibre or body, for example attached to one end of a fibre.

The core may be made big enough to accept more than one mode of light transmission, and depending where the core is cut the intensity of the light can be varied. (I.e. the length of the cable will determine what mode is being transmitted at that point—standing wave effects).

The device could be used as a Raman amplifier for remote sensing—for example at a pollution site. Each chemical has a unique finger print Raman shift due to absorbing a certain wavelength energy. Since it is possible to apply energy of a known laser frequency via an emitted laser beam, and detect a returned very weak Raman emitted light (frequency shifted), it is possible to choose to arrange the Raman amplifier to have a frequency of material such that it amplifies substantially only light of the frequency for which one is looking—i.e. it is sensor for detecting a predetermined chemical. Protection for such a sensor which uses the present invention is sought.

Another use might be as a temperature sensor or strain sensor. The Raman laser effect is sensitive to temperature and strain since the refractive index of the crystal/Raman laser material is sensitive to temperature and strain. For example, when used as a temperature sensor the temperature of a normal operation could be arranged to be such that the device is operating at the rapidly changing portion of the curve of intensity output verses intensity input, and a change in temperature can rapidly move the system outside the Raman amplification zone. Similarly, changes in strain can cause changes in the efficiency of the Raman laser. Protection for sensors incorporating the present invention is sought.

It is possible to arrange for the cladding to have the same refractive index at the pumped frequency as the core and put pump light in the cladding (as well as the core, or only in the cladding), but when the wavelength changes due to the Raman effect the cladding and core can have different refractive indexes for the different frequency light. In this way the Raman light can be trapped in the core, of narrow diameter, and the pump frequency light can be accommodated by a fibre of greater diameter—thereby accommodating greater pump intensity.

Hypothetically, liquid and gas versions of the present invention should work. It is harder to envisage making a gas or liquid device, but they are possible. There are technologies such as polymer dispersed liquid crystals which could be adapted to make a Raman/laser device as in the present invention.

Some Raman materials have a different Stokes shift depending on either the direction of propagation of light through the material, or on the polarisation state of the pumping light. Therefore, if the Raman fibre device is composed of such a Raman material, and the orientation of the particles is random, then several Stokes (and Anti-Stokes) shifts may be possible simultaneously. Likewise, unless the fibre is a polarisation preserving type then the internal polarisation state can vary along the length of the fibre; this together with the random orientation changes the effective polarisation state of the pump light for each particle, again leading to an increased number of possible Raman shifts. It is envisaged that the fibre/body could be of a polarisation preserving type (so that polarisation is the same along its length), or may not be (so polarisation changes along its length).

The invention claimed is:

1. A Raman device comprising:
couplant material and
a plurality of regions of photon-emitting Raman material, each of said
plurality of regions of photon-emitting Raman material producing at least one of Strokes radiation and anti-Stokes radiation, wherein
plurality of regions of photon-emitting Raman material are embedded within said couplant material.

2. A device according to claim 1 wherein said Raman device is a continuous wave Raman laser device.

3. A device according to claim 1 in which said couplant material is glass.

4. A device according to claim 1 wherein said Raman device is an optical parametric oscillator and at least one of said plurality of regions of photon-emitting Raman material comprises parametric oscillator material.

5. A device according to claim 1 wherein the refractive index of said plurality of regions of photon-emitting Raman material and the refractive index of said couplant material are substantially matched over the wavelength range 500–700 nm.

6. A device according to claim 1 and further comprising a temperature controller to control the temperature of said plurality of regions of photon-emitting Raman material and said couplant material.

7. An optical fibre comprising a core region surrounded by a cladding region, wherein said core region comprises a Raman device according to claim 1.

8. A device according to claim 1, wherein said couplant material and said plurality of regions of photon-emitting Raman material are formed as a non-fibrous bulk solid.

9. A device according to claim 1 wherein said Raman device is a Raman laser device and said plurality of regions of photon-emitting Raman material are arranged such that said Raman laser device emits two or more different colours of laser light.

10. A device according to claim 9 wherein said two or more different colours of laser light comprise at least two of the colours red, orange, yellow, green and blue.

11. A device according to claim 9 and further comprising a pump laser, wherein a matrix body is formed by said couplant material and said plurality of regions of photon-emitting Raman material and said matrix body has a length such that said at least two different colours of laser light can be emitted by said device.

12. A device according to claim 9 wherein light produced from a first Raman emission from said photon emitting Raman material drives a second Raman emission from said photon emitting Raman material such that said device emits said two or more different colours of laser light.

13. A device according to claim 1 wherein said plurality of regions of photon-emitting Raman material comprise at least one first region and at least one second region, wherein said at least one first region comprises photon-emitting Raman material of a first kind and said at least one second region comprises photon-emitting Raman material of a second kind.

14. A device according to claim 1 wherein said couplant material is adapted to emit radiation of a first wavelength and said plurality of regions of photon-emitting Raman material are adapted to emit radiation of a different wavelength.

15. A device according to claim 14, wherein the emission of radiation from said couplant material is adapted to cause the emission of radiation from said plurality of regions of photon-emitting Raman material.

16. A device according to claim 14 and further comprising a laser pump source, wherein said couplant material is adapted to produce radiation of a first wavelength when driven by said laser pump source, and said plurality of regions of photon-emitting Raman material regions are arranged to change the wavelength of at least some of said radiation of a first wavelength.

17. A device according to claim 1 wherein said Raman device is a Raman photonic bandgap device.

18. A method of producing laser radiation comprising the steps of;
(i) taking at least one laser body comprising a plurality of Raman laser material regions embedded within a couplant material, and
(ii) introducing laser light into said at least one laser body to cause Raman effect emission form the Raman laser material region.

19. A method according to claim 18 and further comprising the step of shortening the length of said at least one laser body to a desired length chosen such that the Raman radiation emitted comprises at least one desired wavelength.

20. A method according to claim 18 wherein said Raman effect emission comprises at least two of the following types of emission: first Stokes emission; second Stokes emission; third Stokes emission; fourth Stokes emission; subsequent Stokes emissions; first Anti-Stokes emission; subsequent Anti-Stokes emissions.

21. A method according to claim 18 wherein said step of taking at least one laser body comprises taking a laser body that comprises at least two kinds of Raman laser material and producing therefrom at least two different wavelengths of laser light.

22. A method according to claim 18 wherein the step of taking at least one laser body comprises taking at least two laser bodies of similar composition but of different effective lengths such that different wavelength Raman effect radiation is emitted.

23. A method of manufacturing a laser device comprising the step of adding Raman laser material to a couplant material.

24. A method according to claim 23 in which the step of adding Raman laser material to a couplant material comprises mixing particle of Raman laser material with said couplant material.

25. A method according to claim 23 in which the step of adding Raman laser material to a couplant material comprises the steps of (a) dissolving Raman laser material in said couplant material and (b) crystallising out said Raman laser material such that crystals of Raman laser material are formed in said couplant material.

26. A method of manufacturing an optical parametric oscillator device comprising the step of adding optical parametric Raman material to a couplant material.

27. A method according to claim 26 in which the step of adding optical parametric Raman material to a couplant material comprises mixing particle of optical parametric Raman material with said couplant material.

28. A method according to claim 26 in which the step of adding optical parametric Raman material to a couplant material comprises the steps of (a) dissolving optical parametric Raman material in said couplant material and (b) crystallising out said optical parametric Raman material such that crystals of optical parametric Raman material are formed in said couplant material.

29. A device according to claim 1 in which said couplant material is a polymer.

30. A device according to claim 14, wherein the emission of radiation from said plurality of regions of photon-emitting Raman material is adapted to cause the emission of radiation from said couplant material.

31. A device according to claim 1 wherein said Raman device is a Raman photonic crystal device.

32. A device according to claim 1 wherein said Raman device is a Raman detector device.

33. A device according to claim 1 wherein said Raman device is a Raman sensor device.

* * * * *